(12) United States Patent
Ursal et al.

(10) Patent No.: US 9,189,507 B2
(45) Date of Patent: Nov. 17, 2015

(54) SYSTEM AND METHOD FOR SUPPORTING AGILE DEVELOPMENT IN AN ENTERPRISE CRAWL AND SEARCH FRAMEWORK ENVIRONMENT

(71) Applicant: Oracle International Corporation, Redwood Shores, CA (US)

(72) Inventors: D J Vasant Ursal, Austin, TX (US); Tulasi Kodali, Plainfield, NJ (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/733,060

(22) Filed: Jan. 2, 2013

(65) Prior Publication Data

US 2013/0238593 A1     Sep. 12, 2013

Related U.S. Application Data

(60) Provisional application No. 61/609,644, filed on Mar. 12, 2012, provisional application No. 61/609,684, filed on Mar. 12, 2012, provisional application No. 61/609,698, filed on Mar. 12, 2012, provisional application No. 61/621,405, filed on Apr. 6, 2012, provisional application No. 61/659,843, filed on Jun. 14, 2012, provisional application No. 61/659,877, filed on Jun. 14, 2012.

(51) Int. Cl.
| | |
|---|---|
| *G06F 17/30* | (2006.01) |
| *G06F 21/60* | (2013.01) |
| *G06F 21/62* | (2013.01) |
| *H04L 29/06* | (2006.01) |

(52) U.S. Cl.
CPC ...... *G06F 17/30318* (2013.01); *G06F 17/3087* (2013.01); *G06F 17/30289* (2013.01); *G06F 17/30607* (2013.01); *G06F 17/30864* (2013.01); *G06F 21/604* (2013.01); *G06F 21/6227* (2013.01); *G06F 21/6236* (2013.01); *H04L 63/101* (2013.01); *H04L 63/20* (2013.01); *G06F 2221/2119* (2013.01); *G06F 2221/2141* (2013.01)

(58) Field of Classification Search
CPC .............. G06F 17/30864; G06F 17/30087; G06F 17/30707; G06F 17/30873
USPC ....................................... 707/710
See application file for complete search history.

(56) References Cited

U.S. PATENT DOCUMENTS

| | | |
|---|---|---|
| 6,609,123 B1 | 8/2003 | Cazemier |
| 7,689,580 B2 | 3/2010 | Wang et al. |

(Continued)

FOREIGN PATENT DOCUMENTS

| | | |
|---|---|---|
| EP | 2270725 | 1/2011 |

*Primary Examiner* — Cam-Y Truong
(74) *Attorney, Agent, or Firm* — Tucker Ellis LLP

(57) ABSTRACT

Systems and methods for providing an enterprise crawl and search framework, including features such as use with middleware and enterprise application environments, pluggable security, search development tools, user interfaces, and governance. In accordance with an embodiment, the system includes an enterprise crawl and search framework which abstracts an underlying search engine, provides a common set of application programming interfaces for developing search functionalities, and allows the framework to serve as an integration layer between one or more enterprise search engines and one or more enterprise applications. A plurality of searchable objects which are sets of data derived from enterprise applications are used to make view objects available for full text search.

23 Claims, 4 Drawing Sheets

(56) References Cited

U.S. PATENT DOCUMENTS

| | | |
|---|---|---|
| 7,693,897 B2 | 4/2010 | Bugir |
| 7,769,752 B1 | 8/2010 | Turner |
| 8,176,083 B2 | 5/2012 | Vossen |
| 8,266,150 B1 | 9/2012 | Lin |
| 8,621,085 B2 | 12/2013 | Trost |
| 2001/0034733 A1* | 10/2001 | Prompt et al. ............... 707/102 |
| 2002/0107957 A1 | 8/2002 | Zargham |
| 2003/0217034 A1* | 11/2003 | Shutt ............................... 707/1 |
| 2005/0027796 A1* | 2/2005 | San Andres et al. .......... 709/203 |
| 2005/0149496 A1 | 7/2005 | Mukherjee et al. |
| 2006/0200556 A1 | 9/2006 | Brave et al. |
| 2006/0277166 A1 | 12/2006 | Vogler-Ivashchanka |
| 2007/0016604 A1* | 1/2007 | Murthy et al. ................ 707/102 |
| 2007/0130126 A1 | 6/2007 | Lucovsky |
| 2007/0208744 A1 | 9/2007 | Krishnaprasad et al. |
| 2007/0226242 A1* | 9/2007 | Wang et al. ................... 707/102 |
| 2007/0266384 A1 | 11/2007 | Labrou |
| 2007/0277110 A1 | 11/2007 | Rogers |
| 2008/0082573 A1 | 4/2008 | Fish |
| 2008/0114628 A1 | 5/2008 | Johnson |
| 2008/0263462 A1 | 10/2008 | Mayer-Ullmann et al. |
| 2008/0275844 A1 | 11/2008 | Buzsaki |
| 2008/0281824 A1 | 11/2008 | Rangadass |
| 2009/0106207 A1 | 4/2009 | Solheim |
| 2009/0222465 A1 | 9/2009 | Bernard |
| 2010/0205160 A1 | 8/2010 | Kumar |
| 2010/0319067 A1* | 12/2010 | Mohanty et al. ................ 726/21 |
| 2010/0325569 A1* | 12/2010 | King et al. .................... 715/771 |
| 2011/0077936 A1 | 3/2011 | Arumugam |
| 2011/0125764 A1 | 5/2011 | Carmel et al. |
| 2011/0191312 A1* | 8/2011 | Gutlapalli et al. ............ 707/706 |
| 2011/0258199 A1 | 10/2011 | Oliver |
| 2011/0270820 A1 | 11/2011 | Agarwal |
| 2013/0061174 A1 | 3/2013 | Buchanan |
| 2013/0073536 A1* | 3/2013 | Fedorynski et al. .......... 707/709 |
| 2013/0073570 A1 | 3/2013 | Joshi et al. |

* cited by examiner

SYSTEM AND METHOD FOR SUPPORTING AGILE DEVELOPMENT IN AN ENTERPRISE CRAWL AND SEARCH FRAMEWORK ENVIRONMENT

CLAIM OF PRIORITY

This application claims the benefit of priority to U.S. Provisional Patent Application No. 61/609,644, titled "SYSTEM AND METHOD FOR PROVIDING AN ENTERPRISE CRAWL AND SEARCH FRAMEWORK", filed Mar. 12, 2012; U.S. Provisional Patent Application No. 61/609,684, titled "SYSTEM AND METHOD FOR PROVIDING AN ENTERPRISE CRAWL AND SEARCH FRAMEWORK", filed Mar. 12, 2012; U.S. Provisional Patent Application No. 61/609,698, titled "SYSTEM AND METHOD FOR PROVIDING AN ENTERPRISE CRAWL AND SEARCH FRAMEWORK", filed Mar. 12, 2012; U.S. Provisional Patent Application No. 61/621,405, titled "SYSTEM AND METHOD FOR PROVIDING AN ENTERPRISE CRAWL AND SEARCH FRAMEWORK", filed Apr. 6, 2012; U.S. Provisional Patent Application No. 61/659,843, titled "SYSTEM AND METHOD FOR PROVIDING AN ENTERPRISE CRAWL AND SEARCH FRAMEWORK USER INTERFACE", filed Jun. 14, 2012; and U.S. Provisional Patent Application No. 61/659,877, titled "SYSTEM AND METHOD FOR PROVIDING AN ENTERPRISE CRAWL AND SEARCH FRAMEWORK SECURITY", filed Jun. 14, 2012; each of which above applications is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to enterprise applications, and to systems and methods for providing an enterprise crawl and search framework, including features such as use with middleware and enterprise application environments, pluggable security, search development tools, user interfaces, and governance.

BACKGROUND

Enterprise resource planning (ERP) or enterprise applications are commonly used by larger companies and organizations to run important aspects of their business. A typical enterprise application environment may include a database of business content, combined with end-user applications such as customer relationship management (CRM), human capital management (HCM), and business intelligence (BI).

Examples of such environments include Oracle E-Business Suite, and Oracle Fusion Applications, each of which are designed for handling complex business tasks within a large organization.

Organizations have become increasingly interested in greater integration of their business content with their business processes, including the use of transaction processing systems or application servers, such as Oracle WebLogic or Oracle Fusion Middleware, to deliver a higher quality of service in today's increasingly complex business environment. Such organizations can benefit from a richer search experience within their enterprise, which in turn requires rethinking traditional search methodologies. For example, since those company employees seeking particular information are also likely to have the best knowledge regarding their particular situation, it is important that they can obtain the information within that context. These are the general areas that embodiments of the invention are intended to address.

SUMMARY

In accordance with various embodiments, described herein are systems and methods for providing an enterprise crawl and search framework, including features such as use with middleware and enterprise application environments, pluggable security, search development tools, user interfaces, and governance.

As described herein, in accordance with an embodiment, the system includes an enterprise crawl and search framework which abstracts an underlying search engine, provides a common set of application programming interfaces for developing search functionalities, and allows the framework to serve as an integration layer between one or more enterprise search engines and one or more enterprise applications. A plurality of searchable objects which are sets of data derived from enterprise applications are used to make view objects available for full text search.

DETAILED DESCRIPTION

Figure 1:
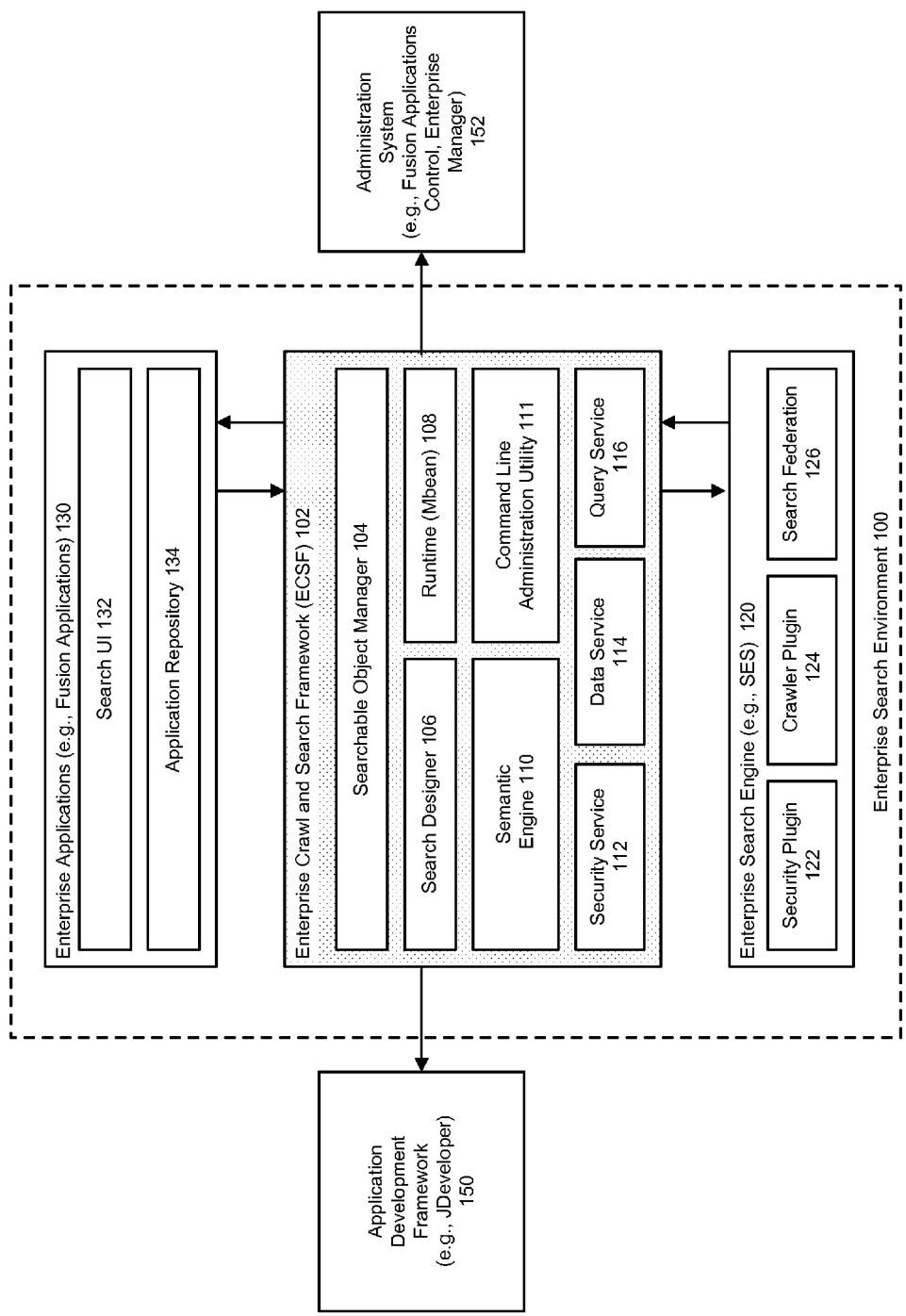
FIG. 1 illustrates an enterprise search environment including an enterprise crawl and search framework, in accordance with an embodiment.

As described above, organizations have become increasingly interested in greater integration of their business content with their business processes, including the use of transaction processing systems or application servers, to deliver a higher quality of service in today's increasingly complex business environment.

In particular, today's enterprise search specialists are looking to several important aspects of enterprise searching for use with their systems, including:

Visibility into the search engine process, which requires that the search engine not only log search activity, but also provide on-board reporting of user interaction.

Greater control of the search process, which enables information technology and business analysts to control and bias the search algorithm when necessary, including the use of relevance weightings for particular classes of content, and determining how host repositories should be indexed.

Improved delivery of search solutions to end-users, including the use of flexible templates for quickly building and rebuilding search experiences, and management dashboards that enable administrators to write and test business rules, relevance weighting profiles, and the indexing process.

Scalability in the search engine architecture, including the ability to scale the architecture using low-cost hardware.

Search engine security, including the ability to perform security checks in the search engine at runtime (when a set of results is queried), at index time (while the indexer crawls the data source), and/or upon a user's search query at execution time, to ensure the user see only that to which they are entitled.

To address this, in accordance with an embodiment, described herein are systems and methods for providing an enterprise crawl and search framework (ECSF), including features such as use with middleware and enterprise application environments, pluggable security, search development tools, user interfaces, and governance.

In accordance with an embodiment, the enterprise crawl and search framework can be used with environments such as Oracle Fusion Applications and/or Oracle WebLogic application server, or other enterprise application and computing environments, to consolidate business content information, and enable transactional search in a business context.

In accordance with an embodiment, the enterprise crawl and search framework includes an open architecture that supports different types of search engine in a plug-and-play manner, e.g., the use of Oracle Secure Enterprise Search (SES) or another open source or proprietary search engine. An administrator can add, define, configure and change search engines; define repositories to be supported; and administer external repositories, such as defining their location, defining and configuring connectors, indexing external data, and defining parameters related to federated search.

In accordance with an embodiment, the enterprise crawl and search framework can support features such as searching across different objects that have 1:1, 1:M, M:1 or M:M relationships with each other, as defined by the organization's business process; and the use of searchable objects, which allow users to control which objects can be exposed and made searchable.

In accordance with an embodiment which uses Fusion Applications, the enterprise crawl and search framework can be provided as part of an integrated environment that includes the framework itself; one or more search engines that provides the fundamental search capability that includes indexing, querying, and security; and a source system, such as a relational database, which stores searchable business content or other information.

In accordance with various embodiments described herein, some of the features and advantages of the enterprise crawl and search framework include:

Transparent integration of enterprise applications (e.g., Fusion Applications) with search engines, which minimizes development time and maximizes the user experience with search.

Code reuse, through the use of a well designed set of abstract classes, to reduce long design cycles.

Basic platform for developing search, which helps developers to grasp the conceptual flow of work easily.

Centralized process and control mechanism, which enhances search functionality.

Basic search functionality, which allows querying based on keyword and search categories.

Advanced search functionality, which allows querying based on keyword, search category, and attribute filters.

Faceted navigation, which allows filtering of search results based on attributes of business objects. For example, users can navigate a search result set based on a set of predefined facets, or dimensions; the system returns a list of facets and their associated set of available values with the search result; users can select a value for each facet, which is then submitted with the search query in order to narrow down the result set.

Actionable results, which are search results with action links associated with the searchable objects. From the search results, users can either go straight to the page displaying the record they selected, or they can invoke a specific task on a search result.

Saved searches, which allows saved search criteria for later use. Users can create new saved search entries, edit and delete existing saved search entries, and retrieve user-specified or public saved search entries.

File attachments, which allow the crawling of attachments associated with transactional objects or records, such as Fusion Applications transactional objects or records.

Crawling of searchable objects that contain appropriate tags.

Crawling of tree structures, which supports search functionality on those source systems which contain data organized in a tree structure (e.g., Oracle Business Intelligence).

Search support for external data sources, which allows querying against search groups that contain non-framework data sources, such as wiki pages and blogs, and which can be directly crawled by the search engine.

ECSF Architecture

FIG. 1 illustrates an enterprise search environment 100 including an enterprise crawl and search framework 102, in accordance with an embodiment. As shown in FIG. 1, in accordance with an embodiment, the framework abstracts an underlying search engine, and provides a common set of application programming interfaces (APIs) for developing search functionalities, which allows the framework to serve as an integration layer between one or more enterprise search engines 120 (e.g., SES), and one or more enterprise applications 130 (e.g., Fusion Applications).

In accordance with an embodiment, the enterprise crawl and search framework includes a searchable object manager component 104, a search designer component 106, a runtime (e.g., managed bean, Mbean) component 108, a semantic engine component 110, a command line administration utility component 111, and one or more security services, e.g., 112, data services, e.g., 114 and query services, e.g., 116. Each of the above components is described in further detail below.

In accordance with an embodiment, the enterprise crawl and search framework integrates with an enterprise search engine (e.g., SES), which provides capabilities for crawling and indexing metadata and objects exposed by the framework. In accordance with an embodiment, the enterprise search engine can include one or more security plugin components, e.g., 122, crawler plugin components, e.g., 124, and search federation components, e.g., 126. Each of the above components is also described in further detail below.

In accordance with an embodiment, each enterprise application can include a search user interface (UI) 132, and an application repository 134.

In accordance with an embodiment, the enterprise search environment including the enterprise crawl and search framework can be accessed by a developer or another user using an application development framework 150 (e.g., Oracle JDeveloper); and by an administrator or another user using an administration system 152 (e.g., Oracle Fusion Applications Control, or Oracle Enterprise Manager).

Searchable Object Manager

In accordance with an embodiment, the searchable object manager component serves as a metadata manager, manages searchable objects, and provides the runtime interface for accessing these objects. At runtime, the searchable object manager loads searchable objects from persistent storage, validates the searchable object definitions, and provides the searchable objects to a crawlable factory component of the data service. In accordance with an embodiment, the searchable object manager is also responsible for the lifecycle management of the searchable objects, which allows administrators to deploy, customize, and enable or disable searchable objects via the command line administration utility component, or the administration system.

Search Designer

In accordance with an embodiment, the search designer component can be provided, e.g., as a page in JDeveloper, including an interface for defining metadata that describes the business objects to be indexed. A developer or another user can use this design interface to specify the security mechanism to be used to protect the data, and to define the searchable object search characteristics, which include advanced search, faceted navigation, and actionable results.

Semantic Engine

In accordance with an embodiment, the semantic engine component leverages the semantic information of searchable object definitions to create context around the search, by interpreting searchable object definitions with relation to the runtime user information during both crawl and query time.

Administration System

In accordance with an embodiment, the administration system can be provided, e.g., as an Enterprise Manager extension that provides a user interface for registering searchable objects in the framework schema of, e.g., the Fusion Applications database, as well as for administering the runtime parameters of the framework, the target search engine, and the configuration of parameters.

Command Line Administration Utility

In accordance with an embodiment, the command line administration utility component is a standalone command line interface that provides a user interface for registering searchable objects in the framework schema of, e.g., the Fusion Applications database. A developer, administrator, or other user can also use the command line administration utility to configure and administer the framework without external dependencies on the administration system.

Security Service

In accordance with an embodiment, the security service component is responsible for providing security information to the search engine. During query time, the security service retrieves the security keys of the user performing the search, and passes those keys to the search engine, where they are used to filter the query results.

In accordance with an embodiment, the security service server component is also invoked during crawl time, to add security information (access control lists, ACL) to data before inserting or creating indexes on the search engine. An ACL identifies the users who can access an associated object, and specifies the user's access rights to that object. The ACL values generated by the security service during crawl time should match the corresponding keys generated during query time.

In accordance with an embodiment, the security service component is implemented as a security engine with a plug-in interface. The security plug-in determines the format of the ACL keys. For custom security models, a new/custom security plug-in can be implemented. In accordance with an embodiment, the security service can use, e.g., Oracle Platform Security for Java, to authenticate users and call the security plug-in to retrieve security values for a given searchable object.

Data Service

In accordance with an embodiment, the data service component is the primary data interface between the enterprise crawl and search framework and the search engine. In accordance with an embodiment, the data service can use a proprietary Really Simple Syndication (RSS) feed format. In addition to supporting the flow of metadata between the framework and the search engine, the data service can support attachments, batching, and error handling.

In accordance with an embodiment, the data service authenticates each search engine crawl request by using, e.g., Platform Security for Java, to validate the user credentials and permissions for crawling the data source. A crawlable factory component, which is part of the data service, determines how searchable objects are broken down, and manages the construction of RSS feeds to the search engine.

Query Service

In accordance with an embodiment, the query service component provides a search interface for the enterprise application's search user interface (UI), and handles all search requests. In accordance with an embodiment, the query service performs query rewrite, parameter substitution, and other preprocessing operations, before invoking the underlying configured search engine. Search results are also serviced via this service. Hooks can be provided to preprocess and postprocess data, which facilitates the capability to filter search results.

Search Engine

In accordance with an embodiment, the search engine component (e.g., SES) enables a secure, uniform search across multiple enterprise repositories. The enterprise crawl and search framework integrates with the search engine to provide full-text search functionality in enterprise applications (e.g., Fusion Applications).

Security Plug-in

Some search engines, such as SES, provide an API for writing security plug-ins or connectors, e.g., in Java, which allows a developer to provide a security plug-in to meet their requirements. In accordance with an embodiment, the enterprise crawl and search framework can interface with this security plug-in. The security plug-in invokes the security service to retrieve keys, to which the user has access, for filtering the results that are delivered to the query service. In accordance with an embodiment, a proxy user must be set up on the search engine in order to invoke the security service, and must have security privileges for the enterprise applications (e.g., Fusion Applications).

Crawler Plug-in

In accordance with an embodiment, the crawler plug-in component is a search engine module that implements the modified RSS feed format between the enterprise crawl and search framework and the search engine. In accordance with an embodiment, the crawler plug-in component deserializes data communicated by the framework, via the data service component, and interfaces with the search engine components that create the indexes.

Search Federation

In accordance with an embodiment, the search federation component provides support for the user of federated search engine instances.

Figure 2:
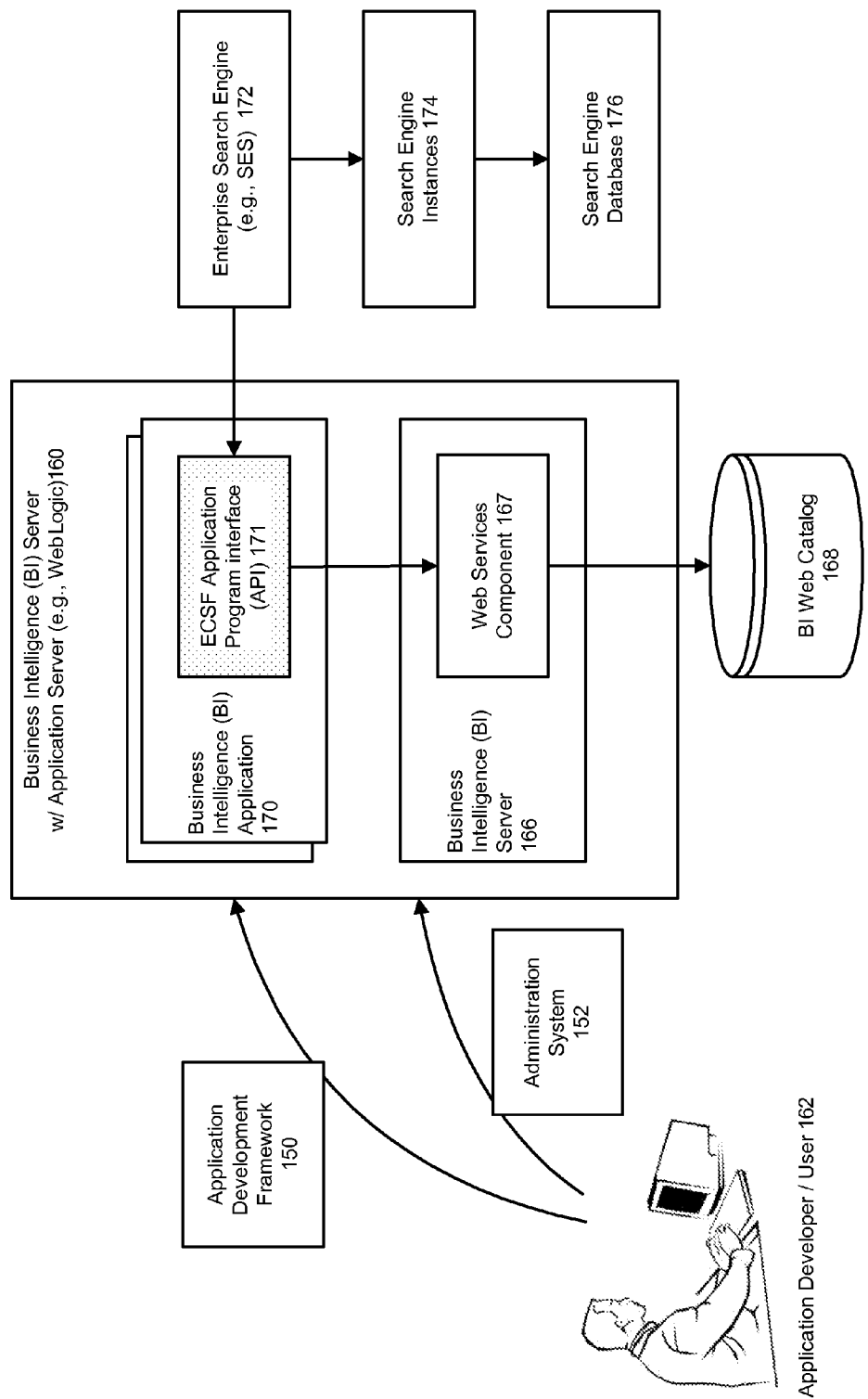
FIG. 2 illustrates an enterprise resource planning or enterprise application environment which includes an enterprise crawl and search framework, in accordance with an embodiment.

FIG. 2 illustrates an enterprise resource planning or enterprise application environment which includes an enterprise crawl and search framework, in accordance with an embodiment. It will be evident that the environment illustrated in FIG. 2 is provided merely as an illustrative example of the type of environment that can utilize various embodiments of the invention, and that, in accordance with other embodiments, different environments can be used.

As shown in FIG. 2, in accordance with an embodiment, a business intelligence (BI) server environment 160, such as an Oracle Business Intelligence environment using WebLogic application server, can include a BI server 166, and a web services component 167, that provides access to a BI web catalog of business content, data, or other information 168.

In accordance with an embodiment, one or more BI applications 170 can include an enterprise crawl and search framework API 171, which allows a developer or other user 162 using an application development framework and/or administration system, to configure the BI application(s) to take advantage of the enterprise crawl and search framework, including leveraging the enterprise search engine 172, search instances 174, and search engine database 176, to provide full-text search functionality across the applications.

Agile Development Support

In accordance with an embodiment, a system including the enterprise crawl and search framework can include support for agile development.

Figure 3:
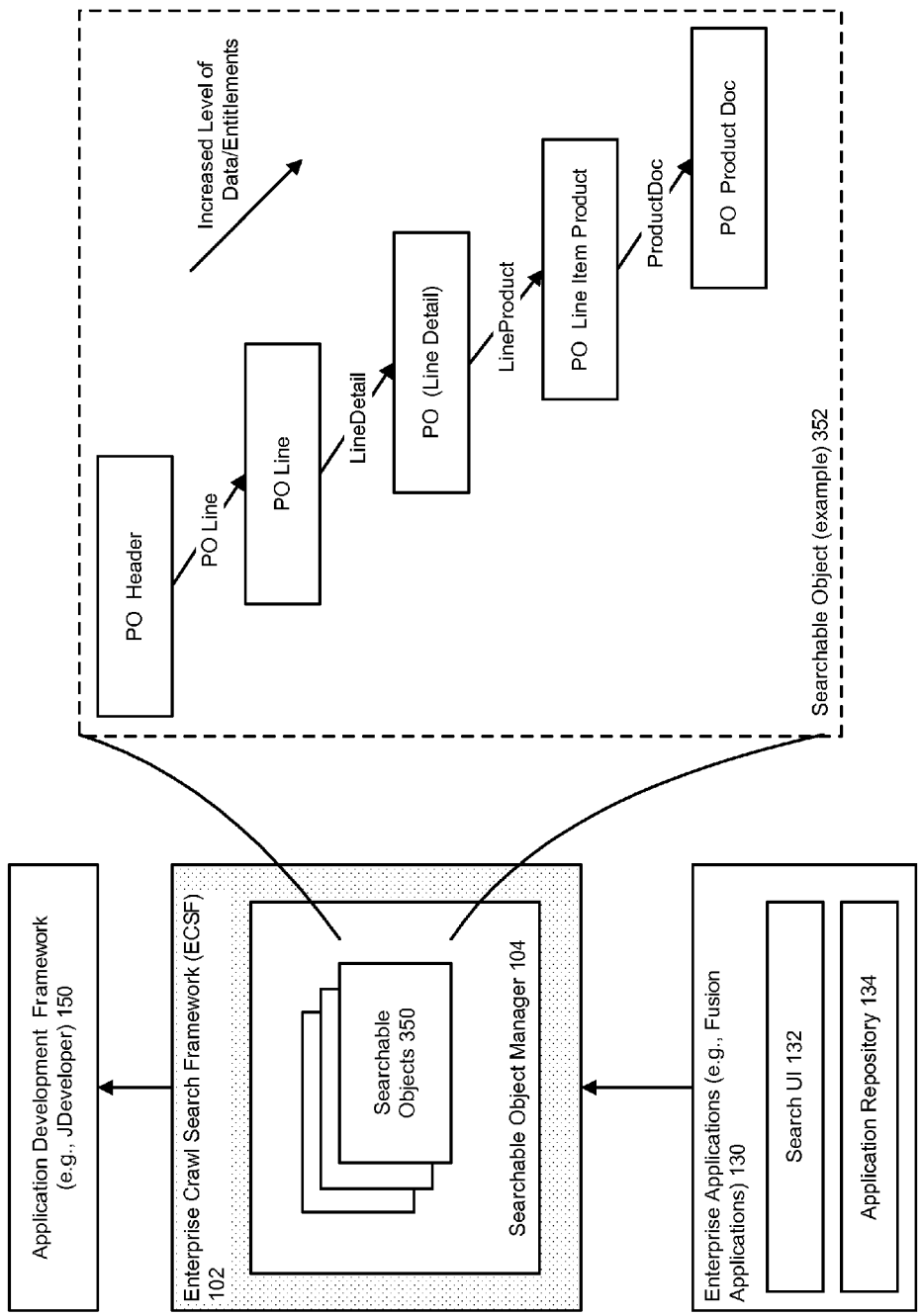
FIG. 3 illustrates an enterprise crawl and search framework that supports agile development, including the use of searchable objects, in accordance with an embodiment.

FIG. 3 illustrates an enterprise crawl and search framework that supports agile development, including the use of searchable objects, in accordance with an embodiment. As shown in FIG. 3, in accordance with an embodiment, searchable objects 350 are sets of data derived from enterprise applications that make view objects available for full text search. The searchable objects are used in an abstract way for exposing business data to the search engine.

For example, as shown in FIG. 3, a purchase order intended to be exposed as a searchable object 352 can be defined as a set of searchable properties and its relationship to other searchable objects.

Business data can be both structured and unstructured, such as data residing in a database, file attachments (including images), and documents. The abstraction allows searchable objects to be bound to different contexts at runtime and to be described and used within that context. Since the binding information describes how a searchable object behaves in a given context, it is sometimes called search metadata.

In accordance with an embodiment, the enterprise crawl and search framework is used to integrate search functionality in enterprise applications (e.g., Fusion Applications) by defining searchable objects and its attributes. Defining the searchable objects enables the corresponding view objects and its attributes for search and creates the necessary metadata for the enterprise crawl and search framework.

In accordance with an embodiment, the framework metadata can be packaged into an application archive and subsequently be used by the framework runtime to deploy data sources into the enterprise search engine (e.g., SES), to perform crawling and index operations. All artifacts (e.g., Java archive files, Oracle Application Development Framework (ADF) objects), on which the view objects depend, must be packaged in the enterprise archive (EAR) file in order to make the searchable objects usable during runtime for both crawl and query.

In accordance with an embodiment, the enterprise crawl and search framework indexes data based on a view object, which represents the top level view object to crawl. Many business objects are hierarchical. In accordance with an embodiment, the enterprise crawl and search framework can leverage ADF methods of describing such hierarchies by using view links.

In accordance with an embodiment, the enterprise crawl and search framework supports multiple levels of a view hierarchy. By defining additional view objects and linking the top level view object to the additional view objects through a view link, parent, child, grandchild, and so on relationships are formed. Once a view link is set, a developer can reference data in those successive objects for indexing by using Groovy, a Java-like scripting language that is dynamically compiled and evaluated at runtime.

In accordance with an embodiment, the enterprise crawl and search framework determines if a user has access to a search category depending on whether or not the user has permission to access the searchable objects in the category. Search categories, also called search groups, are the logical collections of searchable objects that facilitate group search on related items. Search categories are directly used for querying. If all of the searchable objects in a search category are not accessible to the user, then that category does not appear in the user's category list.

Figure 4:
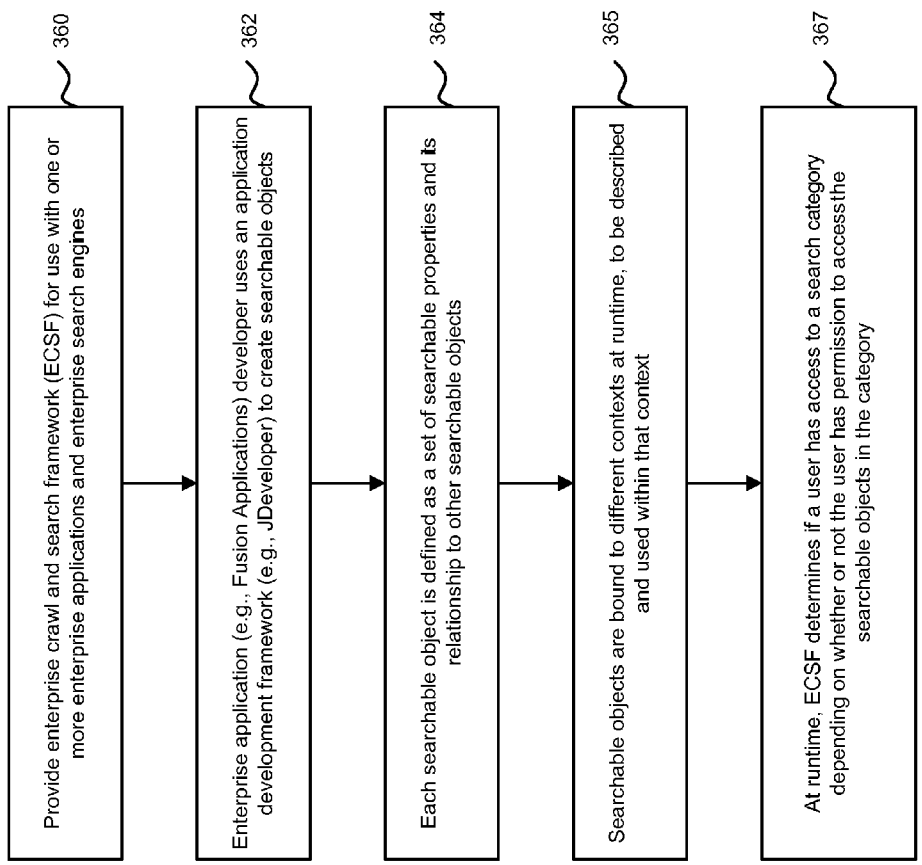
FIG. 4 illustrates a method of supporting agile development with an enterprise crawl and search framework using searchable objects, in accordance with an embodiment.

FIG. 4 illustrates a method of supporting agile development with an enterprise crawl and search framework using searchable objects, in accordance with an embodiment. As shown in FIG. 4, at step 360, an enterprise crawl and search framework (ECSF) is provided for use with one or more enterprise applications and enterprise search engines.

At step 362, an enterprise application (e.g., Fusion Applications) developer uses an application development framework (e.g., JDeveloper) to create searchable objects.

At step 364, each searchable object is defined as a set of searchable properties and its relationship to other searchable objects.

At step 365, searchable objects are bound to different contexts at runtime, to be described and used within that context.

At step 367, at runtime, the enterprise crawl and search framework determines if a user has access to a search category depending on whether or not the user has permission to access the searchable objects in the category.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

In particular, it will be evident that, although many of the examples described above illustrate the use of an enterprise crawl and search framework within an environment that includes an Oracle Fusion Applications enterprise application, and an Oracle Secure Enterprise Search enterprise search engine, in accordance with various embodiments, the enterprise crawl and search framework, and features and methods described can be used with other types of enterprise application, and other types of enterprise search engine.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for supporting agile development, the system comprising:
    a computer comprising at least one microprocessor;
    an enterprise crawl and search framework (ECSF), executing on the computer, which abstracts an underlying search engine, provides a common set of application programming interfaces (APIs) for developing search functionalities, and provides an integration layer between the search engine and one or more enterprise applications;
    a plurality of view objects, each view object representing a top level object associated with one or more additional view objects to form relationships among the top level object and the additional view objects, wherein each view object of the plurality of view objects and the additional view objects represent data associated with an enterprise application and residing in an environment associated with the enterprise application; and
    a plurality of searchable objects derived from the enterprise applications, wherein each searchable object includes a set of searchable properties that make data represented by one or more view objects available for full text search;
    wherein the ECSF is executed to:
    create search metadata, based on the deriving from the enterprise application, wherein the search metadata binds a searchable object to a particular context at runtime and defines behaviors of the searchable object when used in the particular context, including defining whether the searchable object is accessible to a particular user;
    determine if a particular user has access to a first search category of a search category list based on whether the particular user has permission to access searchable objects in the first search category in accordance with the search metadata;
    selectively cause the first search category to appear in the search category list in accordance with determining whether the particular user has the access to the first search category;
    use an input to index data represented by the view objects, and expose the indexed data for use by the search engine.

2. The system of claim 1, wherein the searchable object is bound to the particular context and to be described and used within that context.

3. The system of claim 1, wherein if all of the searchable objects in a search category are not accessible to the user, then that category does not appear in the user's category list.

4. The system of claim 1, wherein the search engine is an Oracle Secure Enterprise Search engine, and wherein the enterprise applications are Oracle Fusion Applications.

5. The system of claim 1, wherein the environment associated with the enterprise application is a relational database, and the data is business content.

6. The system of claim 1, wherein each searchable object is bound to a different context.

7. The system of claim 1, wherein each searchable object is created by an associated enterprise application developer using an application development framework.

8. The system of claim 1, wherein the relationships among the top level object and the additional view objects are hierarchical.

9. A method for providing support for agile development, the method comprising:
    providing an enterprise crawl and search framework (ECSF) which abstracts an underlying search engine, provides a common set of application programming interfaces (APIs) for developing search functionalities, and provides an integration layer between the search engine and one or more enterprise applications;
    providing, by using a computer, a plurality of view objects, each view object representing a top level object associated with one or more additional view objects to form relationships among the top level object and the additional view objects, wherein each view object of the plurality of view objects and the additional view objects represent data associated with an enterprise application and residing in an environment associated with the enterprise application;
    providing a plurality of searchable objects derived from the enterprise applications, wherein each searchable object includes a set of searchable properties that make data represented by one or more view objects available for full text search; creating, based on the deriving from the enterprise applications, search metadata that binds a searchable object to a particular context at runtime and defines behaviors of the searchable object when used in the particular context, including defining whether the searchable object is accessible to a particular user;
    determining if a particular user has access to a first search category of a search category list based on whether the particular user has permission to access searchable objects in the first search category in accordance with the search metadata;
    selectively causing the first search category to appear in the search category list in accordance with determining whether the particular user has the access to the first search category;
    indexing data represented by the view objects using an input; and
    exposing the indexed data for use by the search engine.

10. The method of claim 9, wherein the searchable object is bound to the particular context and to be described and used within that context.

11. The method of claim 9, wherein if all of the searchable objects in a search category are not accessible to the user, then that category does not appear in the user's category list.

12. The method of claim 9, wherein the search engine is an Oracle Secure Enterprise Search engine, and wherein the enterprise applications are Oracle Fusion Applications.

13. The method of claim 9, wherein the environment associated with the enterprise application is a relational database, and the data is business content.

14. The method of claim 9, wherein each searchable object is bound to a different context.

15. The method of claim 9, wherein each searchable object is created by an associated enterprise application developer using an application development framework.

16. The method of claim 9, wherein the relationships among the top level object and the additional view objects are hierarchical.

17. A non-transitory computer readable storage medium, including instructions stored thereon, which when read and executed by a computer cause the computer to perform steps comprising:
 providing an enterprise crawl and search framework (ECSF) which abstracts an underlying search engine, provides a common set of application programming interfaces (APIs) for developing search functionalities, and provides an integration layer between the search engine and one or more enterprise applications;
 providing a plurality of view objects, each view object representing a top level object associated with one or more additional view objects to form relationships among the top level object and the additional view objects, wherein each view object of the plurality of view objects and the additional view objects represents data associated with an enterprise application and residing in an environment associated with the enterprise application;
 providing a plurality of searchable objects derived from the enterprise applications, wherein each searchable object includes a set of searchable properties that make data represented by one or more view objects available for full text search; creating, based on the deriving from the enterprise applications, search metadata that binds a searchable object to a particular context at runtime and defines behaviors of the searchable object when used in the particular context, including defining whether the searchable object is accessible to a particular user;
 determining if a particular user has access to a first search category of a search category list based on whether the particular user has permission to access searchable objects in the first search category in accordance with the search metadata;
 selectively causing the first search category to appear in the search category list in accordance with determining whether the particular user has the access to the first search category;
 using an input, indexing data represented by the view objects; and exposing the indexed data for use by the search engine.

18. The non-transitory computer readable storage medium of claim 17, wherein the searchable object is bound to the particular context and to be described and used within that context.

19. The non-transitory computer readable storage medium of claim 17, wherein if all of the searchable objects in a search category are not accessible to the user, then that category does not appear in the user's category list.

20. The non-transitory computer readable storage medium of claim 17, wherein the underlying search engine is an Oracle Secure Enterprise Search engine, and wherein the enterprise applications are Oracle Fusion Applications.

21. The non-transitory computer readable storage medium of claim 17, wherein the environment associated with the enterprise application is a relational database, and the data is business content.

22. The non-transitory computer readable storage medium of claim 17, wherein each searchable object is created by an enterprise application developer using an application development framework.

23. The non-transitory computer readable storage medium of claim 17, wherein the relationships among the top level object and the additional view objects are hierarchical.

* * * * *